United States Patent
Takeuchi et al.

[11] Patent Number: 6,116,637
[45] Date of Patent: Sep. 12, 2000

[54] AIR BELT DEVICE

[75] Inventors: Hiroyuki Takeuchi, Hikone; Yoji Suyama, Nagano, both of Japan

[73] Assignee: Takata Corporation, Tokyo, Japan

[21] Appl. No.: 09/145,277

[22] Filed: Sep. 2, 1998

[30] Foreign Application Priority Data

Sep. 2, 1997 [JP] Japan ..................... 9-236903

[51] Int. Cl.⁷ .................................................. B60R 21/18
[52] U.S. Cl. .................................................... 280/733
[58] Field of Search ................................. 280/733, 807

[56] References Cited

U.S. PATENT DOCUMENTS

| | | | |
|---|---|---|---|
| 3,791,670 | 2/1974 | Lucore et al. | 280/733 |
| 3,801,156 | 4/1974 | Granig | 280/733 |
| 3,869,145 | 3/1975 | Takada | 280/733 |
| 3,877,719 | 4/1975 | Lewis et al. | 280/733 |
| 5,346,250 | 9/1994 | Kamiyama | 280/733 |
| 5,383,713 | 1/1995 | Kamayama et al. | 280/733 |
| 5,385,367 | 1/1995 | Tanaka et al. | 280/733 |
| 5,390,953 | 2/1995 | Tamaka et al. | 280/733 |

FOREIGN PATENT DOCUMENTS

5-85301  4/1993  Japan .

Primary Examiner—Brian L. Johnson
Assistant Examiner—Michael Britton
Attorney, Agent, or Firm—Foley & Lardner

[57] ABSTRACT

An air belt 2B has a bag-like belt potion 10 and a knit cover 12 that surround the bag-like belt portion 10. The bag-like portion 10 has a greater width in the part that fits to the passenger's body between the shoulder and abdomen. The enlarged part of the bag-like portion 10 is folded on top of itself to form a strap-like shape. The knit cover 12 is woven so that it is expandable in the direction perpendicular to the longitudinal direction of the belt, but virtually not in the longitudinal direction. Upon activation of a gas generator 9 with a buckle 4 engaged with a tongue 5, the air belt 2B inflates. During the inflation, the length of the knit cover 12 shortens in the longitudinal direction of the belt 2B, thereby causing the belt 2B to tightly fit on the passenger's body. This ensures the proper protection of the passenger.

18 Claims, 13 Drawing Sheets

NORMAL PATTERN OF WEAVING

COURSE
WALE

FIG. 4(b)

WEAVING PATTERN USING INLAY THREADS

⊏⊐ WEAVING THREADS
▨ INLAY THREADS

COURSE
WALE

AIR BELT DEVICE

BACKGROUND OF THE INVENTION

The present invention relates to a seat belt for protecting automobile passengers during collisions, and more particularly to an air belt having a bag-like portion, which is inflated by gas generated by a gas generator.

Figure 12A:
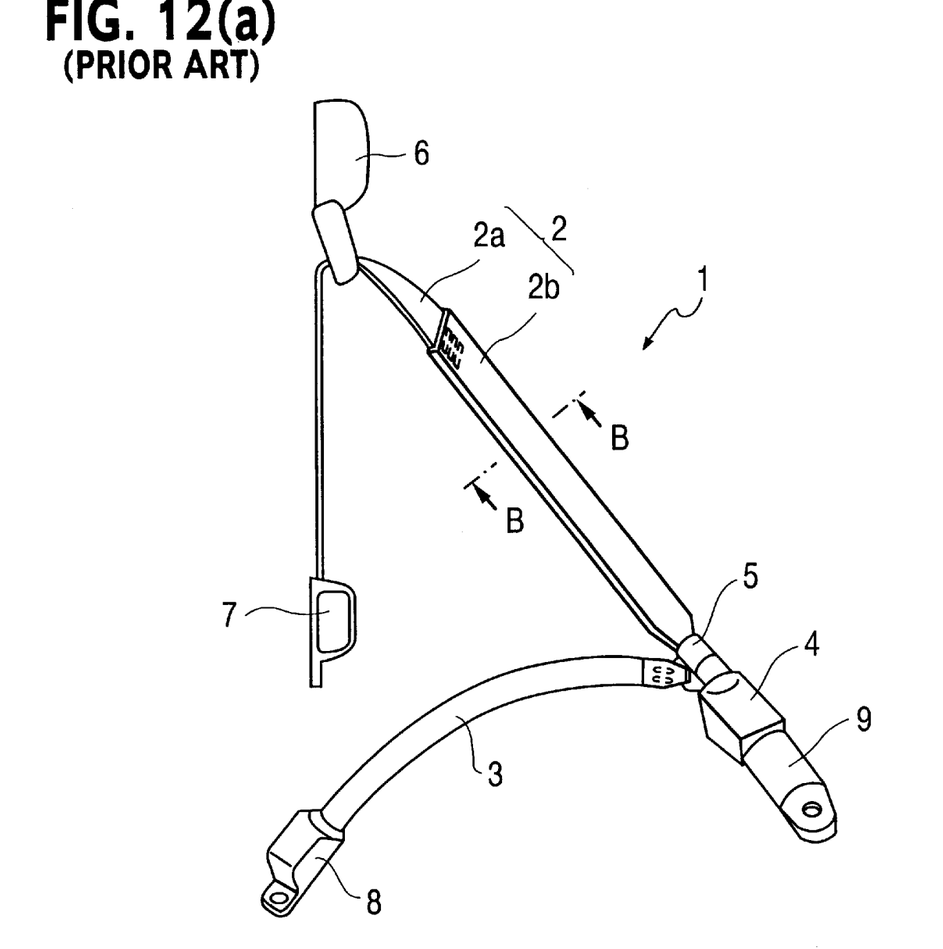
FIGS. 12(a) and 12(b) show a prior air belt device.
Figure 12B:
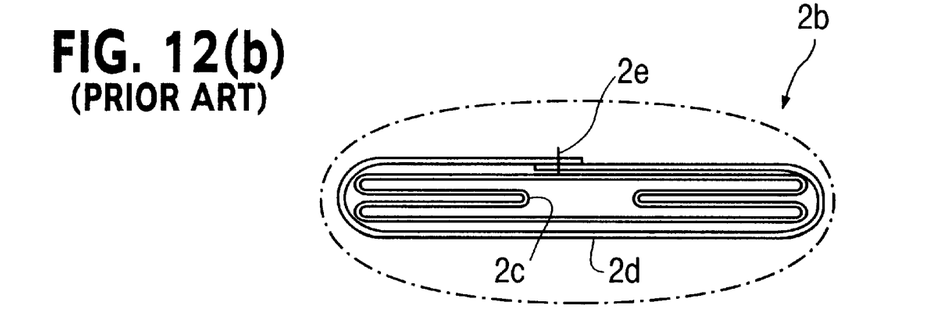

Japanese Unexamined Patent Publication No. 5-85301 describes a typical inflatable safety harness. FIG. 12(a) is a perspective view showing the inflatable air belt. FIG. 12(b) is a cross sectional view of the air belt shown in FIG. 12(a) taken along line B—B.

An air belt device 1 includes a shoulder belt 2, a lap belt 3, a buckle 4, a tongue 5, and an intermediate guide 6. The shoulder belt 2 extends diagonally from the right side of a passenger's body to the left side. The lap belt 3 extends across the passenger's body from the right to the left. The buckle 4 is secured to a floor, or the like of the vehicle body. The intermediate guide guides the shoulder belt 2.

The shoulder belt 2 has an ordinary belt 2a similar to the conventional seat belts, and a bag-like belt portion 2b attached to one end of the belt 2a. The intermediate guide 6 slidably supports the belt 2a. The other end of the belt 2a is connected to an emergency locking retractor (ELR), which is secured to the automobile body. The ELR winds and retracts the belt 2a.

The bag-like belt portion 2b engages with the passenger's body when in use. It has the tongue 5 at its free end opposite to the end that leads to the belt 2a.

The lap belt 3 is an ordinary and commonly available belt. One end of the lap belt 3 is connected to the tongue 5 while the other end of the belt is connected to the ELR, which is secured to the automobile body. The buckle 4 has a gas generator 9 to generate a high pressure gas upon accidents such as collisions.

A passage extends through the tongue 5 and the buckle 4 to allow flow of gas from the generator 9.

As shown in FIG. 12b, the bag-like portion 2b of the shoulder belt 2 includes a folded belt body 2c, as indicated by solid lines, and is enclosed in a cover 2d, the two edges of which are sewed to each other to form stitches 2e. Accordingly, the structure of the bag-like portion has a strap-like shape. Upon activation of the gas generator 9, the stitch 2e tears as the shoulder belt 2 inflates, and the bag-like portion 2b expands as shown by the double dotted line.

Employing a retractable webbing, which is attached to one end of the shoulder belt and is wound by a retractor, the air belt device described in Japanese Unexamined Publication No. 5-85301 ensures a large degree of freedom with respect to the passenger's upper body movement, where the webbing extends and retracts in response to the movements of the passenger. It would be required, however, that the winding force of the retractor 7 in the air belt in Japanese Unexamined Publication No. 5-85301 not be too strong to prevent the belt from pressing the passenger with excessive force. Due to the limitation on the winding force, the gap arises between the shoulder belt 2 and the passenger's body, requiring further expansion of the bag-like portion 2B upon a collision.

SUMMARY OF THE INVENTION

Accordingly, it is an objective of the present invention to provide an air belt device that works without applying excessive force on the passenger's body by shortening the length of the air belt to protect the passenger adequately.

The present invention provides an air belt device. The air belt device includes an inflatable air belt and a gas generator for supplying gas to the air belt to inflate the same. The air belt has a bag-like belt folded in a strip-like state and a cover for covering the bag-like belt. The air belt device being characterized in that the cover is substantially free of expansion in a longitudinal direction with respect to the air belt and capable of expanding in the same direction as the air belt expands so as to reduce a longitudinal dimension of the air belt.

In this air belt device, the activation of the gas generator inflates the air belt and the cover. The cover does not extend in the longitudinal direction of the air belt. This shortens the length of the air belt during inflation. Thus, the shortened air belt fits on the passenger tightly.

In the present invention, a gas releasing means gradually releases the residual gas in the air belt after the inflation of the air belt by the gas generator.

The gas releasing means gradually releases the gas from the air belt to reduce the impact that applies on the passenger upon a collision.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

The accompanying drawings, which are incorporated in and constitute a part of the specification, illustrate a presently preferred exemplary embodiment of the invention, and, together with the general description given above and the detailed description of the preferred embodiment given below, serve to explain the principles of the invention.

DETAILED DESCRIPTION OF THE PREFERRED EMBODIMENT

Figure 1A:
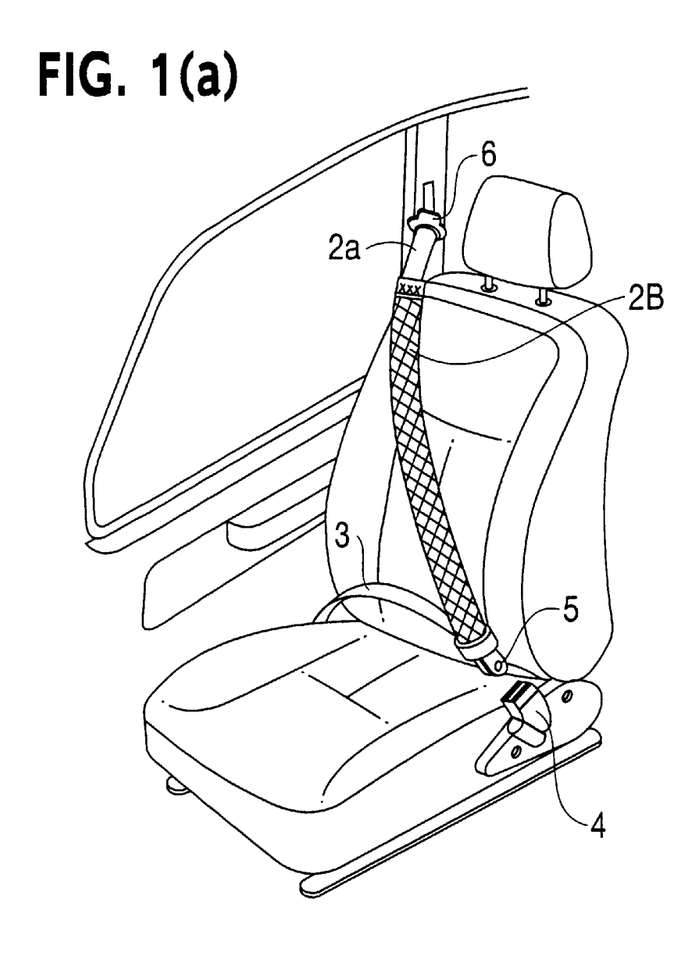
FIGS. 1(a) and 1(b) are perspective views of an automobile seat with an air belt device according to the invention.
Figure 1B:
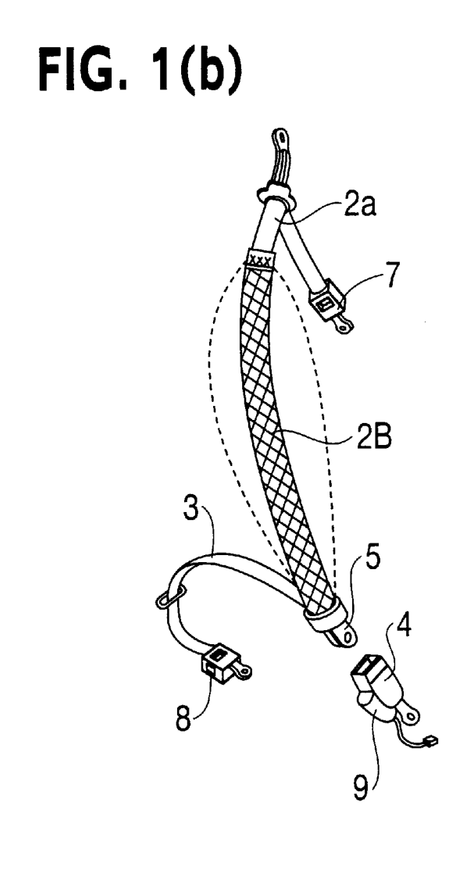
Figure 2A:
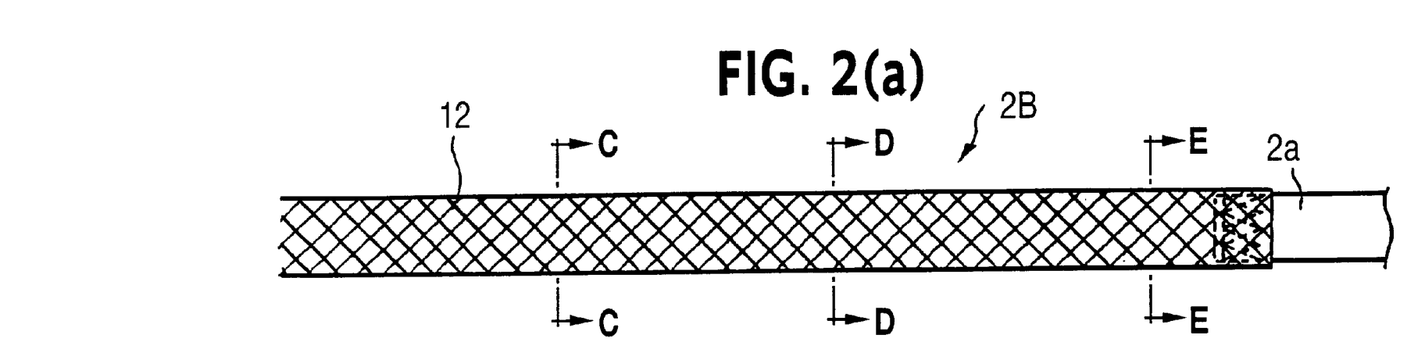
FIGS. 2(a)–2(e) show various components of an air belt according to the present invention.
Figure 2B:
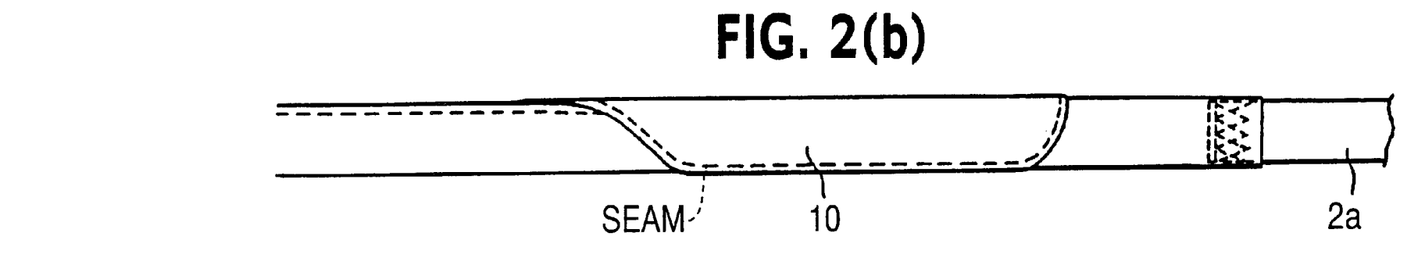
Figure 2C:
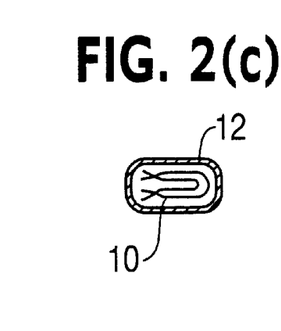
Figure 2D:
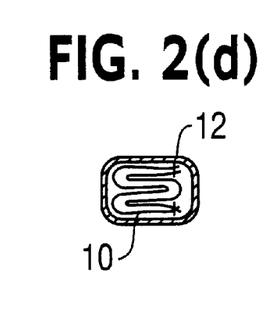
Figure 2E:
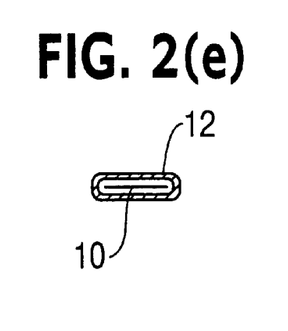
Figure 3A:
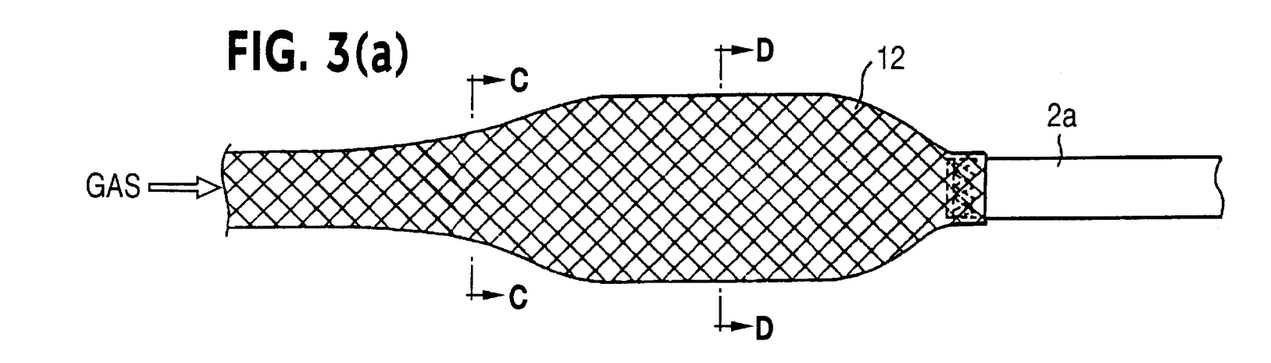
FIGS. 3(a)–3(d) show an air belt according to the present invention, shown as inflated.
Figure 3B:
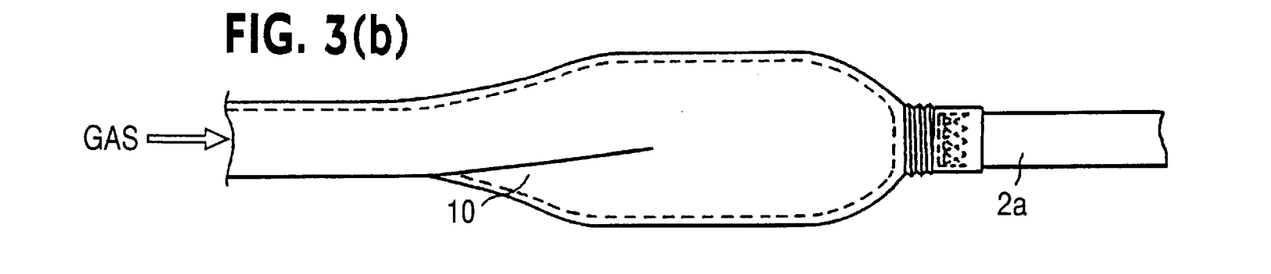
Figure 3C:
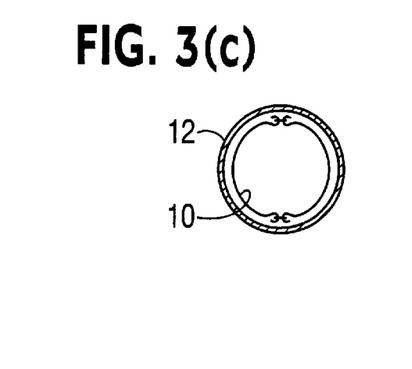
Figure 3D:
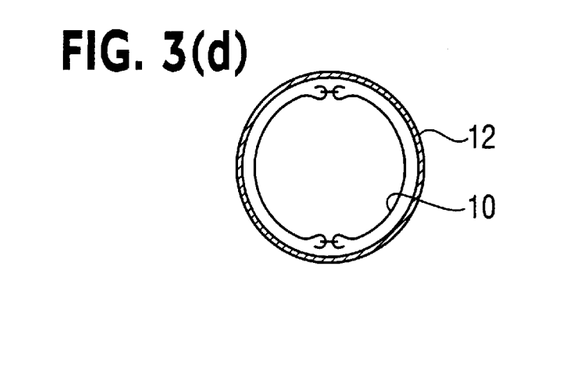
Figure 4A:
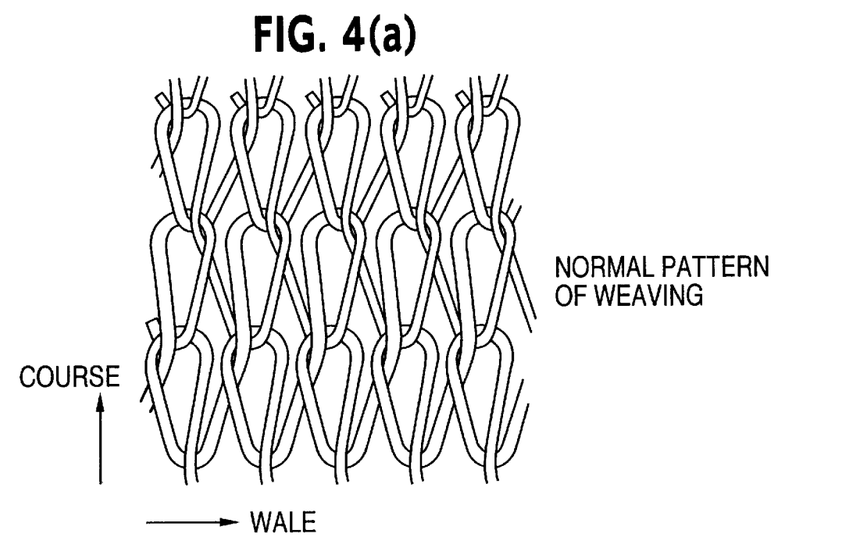
FIGS. 4(a)–4(b) show different weaving patterns of a knit cover according to the present invention.
Figure 4B:
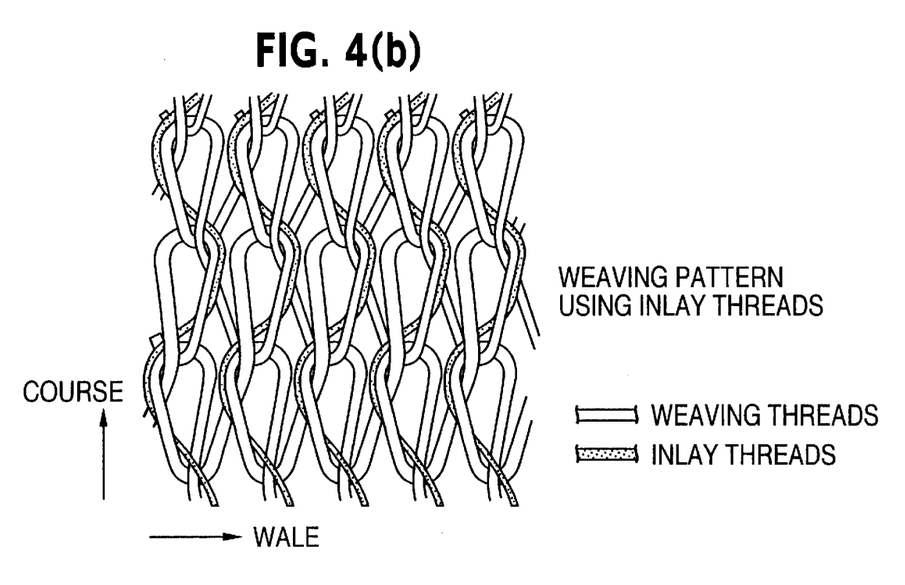

An embodiment according to the present invention will now be described with reference to the drawings. FIG. 1(a)

is a perspective view showing an automobile seat with an embodiment of an air belt device according to the present invention. FIG. 1(b) is an perspective view of the air belt device. FIG. 2(a) is a plane view showing the region around the joint between a shoulder belt and a lap belt, and FIG. 2(b) is a plane view showing a bag-like belt portion. FIGS. 2(c), 2(d), 2(e) are cross-sectional views taken along lines C—C, D—D, E—E, respectively in FIG. 2(a). FIG. 3(a) is a plane view showing the shoulder belt that is inflated. FIG. 3(b) is a plane view of the bag-like portion that is inflated. FIGS. 3(c) and 3(d) are cross-sectional views taken along lines C—C and D—D respectively in FIG. 3(a). FIG. 4 shows weaving patterns of an air belt cover.

Since the air belt device according to the embodiment is essentially the same as the air belt device shown in FIG. 12 except for a bag-like portion 2B that comprises a shoulder belt 2, the arrangements of the air belt 2B will mainly be discussed.

As can be seen in FIGS. 2 and 3, the air belt 2B includes a bag-like belt 10 and a tubular knit cover 12 enclosing the bag-like belt 10. The bag-like belt 10 has a greater width in the part that fits to the passenger's body over the region from the chest to abdomen. The enlarged portion is folded on top of itself to form a long band shape as shown in FIG. 2.

The knit cover 12 has considerable elasticity in the direction perpendicular to the belt's longitudinal direction whereas it virtually doesn't expand longitudinally. The weaving patterns of the knit cover are shown in FIGS. 4(a), 4(b) where FIG. 4(a) shows a simple warp knit pattern and FIG. 4(b) shows a pattern into which inlay threads are introduced to increase the strength and allow the thinner structure. Either pattern can be used in the present invention. The knit cover 12 is made virtually unexpandable in the longitudinal direction by applying the thermal expansion process.

The air belt 2B and lap belt 3 are sewed to each other. Both the bag-like belt 10 and knit cover 12 are sewn to the lap belt 3. The knit cover 12 is sewn to a webbing 2a as well as to a tongue 5 to reduce the tension that acts on the belt.

Since all the other features of the embodiment but the points described above are essentially the same as the air belt device shown in FIG. 12(a), the air belt 2B inflates when a gas generator 9 is activated with the tongue 5 engaging with the buckle 4. Upon the activation of the gas generator 9, the knit cover 12 contracts in the longitudinal direction of the air belt 2B, causing the belt 2B to tightly fit on the passenger.

Figure 13:
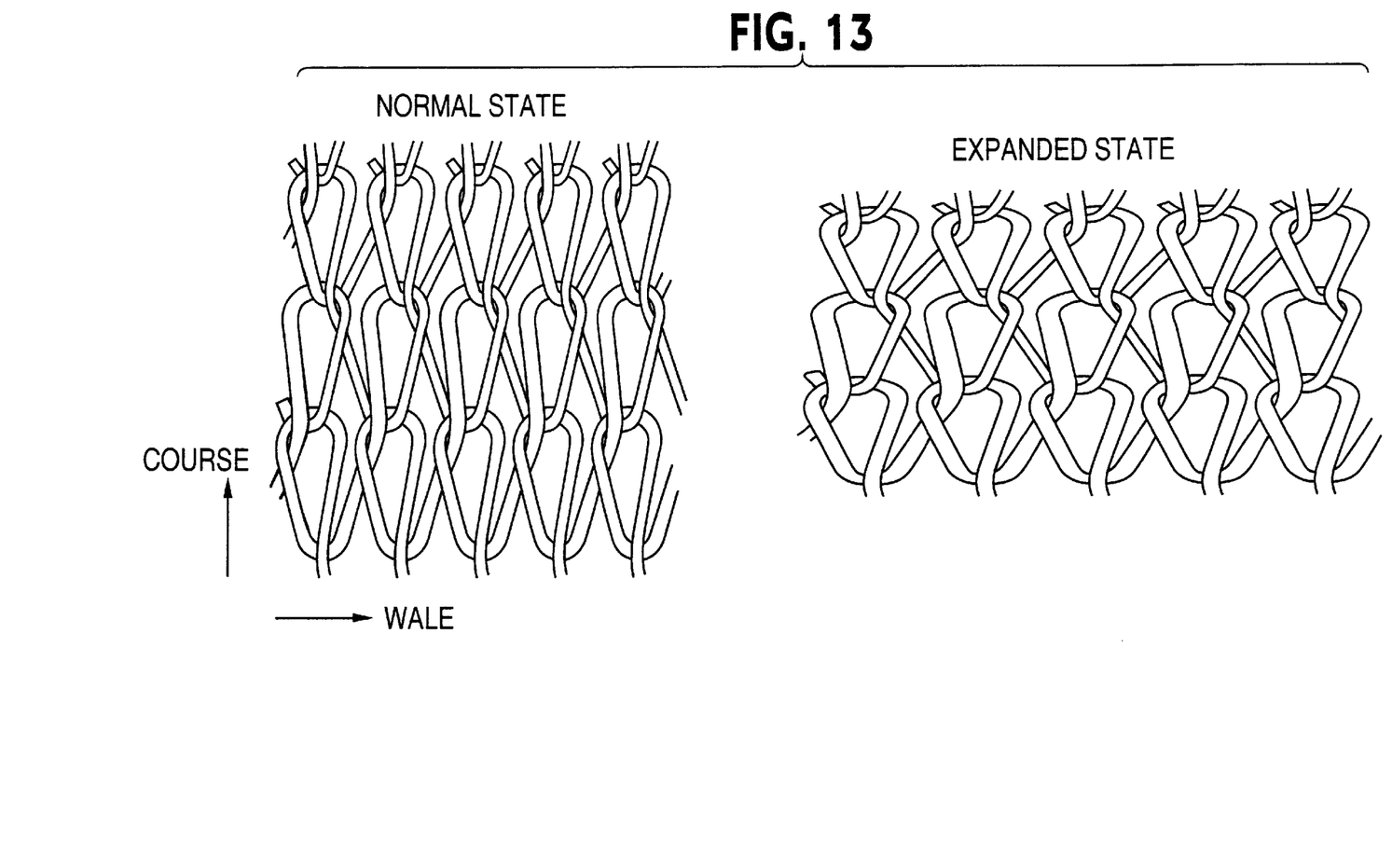
FIG. 13 shows comparative pictures of an air belt, showing the air belt under normal conditions and the belt that is inflated.
Figure 14:
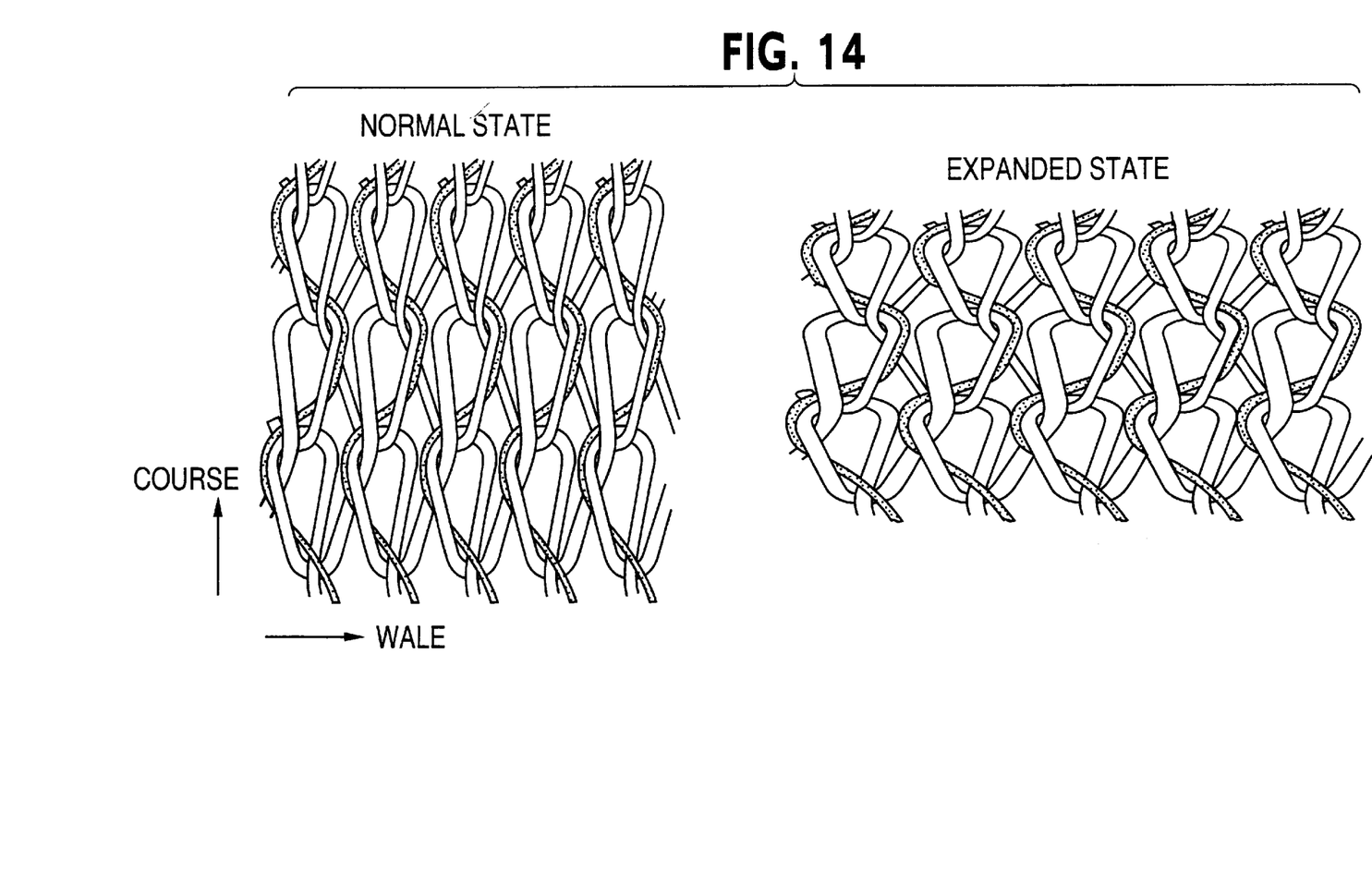
FIG. 14 shows comparative pictures of another air belt, showing the air belt under normal conditions and the belt that is inflated.

FIGS. 13 and 14 show how the knit cover 12 contracts longitudinally when the air belt 2B, or bag-like belt 10 inflates. As was mentioned above, the knit cover 12 is made virtually unexpandable in the longitudinal direction of the belt by means of the thermal expansion process. When the belt 10 inflates, the knitted loops of the knit cover 12 expand in the direction perpendicular to the longitudinal direction of the belt. This shortens the knit cover 12 longitudinally, and consequently the air belt 2B.

Embodiments of a tongue and a buckle that can preferably be employed in the present invention will now be described with reference to FIGS. 5 through 11.

Figure 5A:
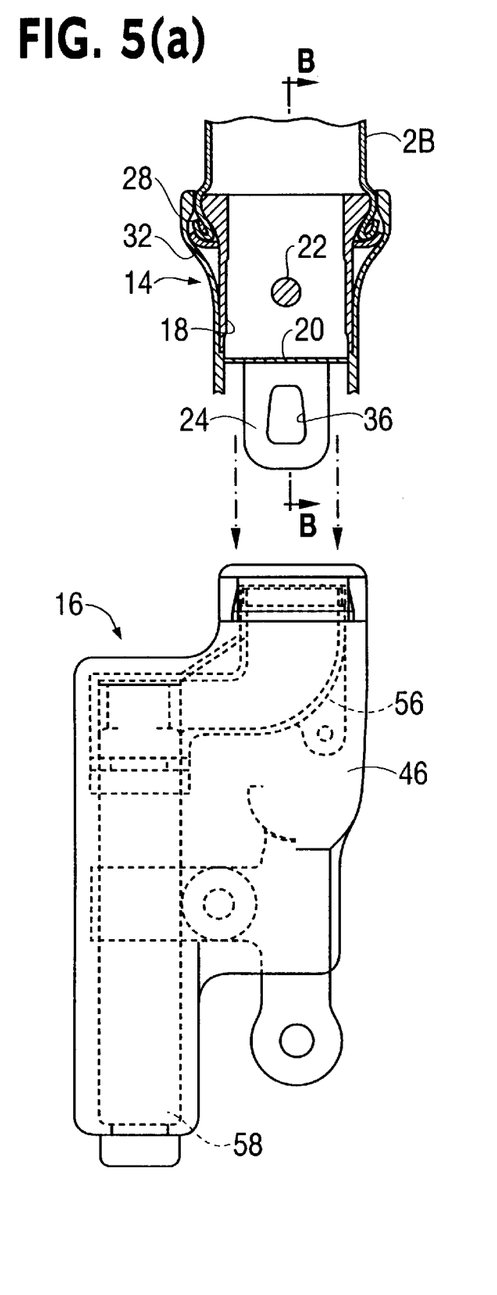
FIGS. 5(a) and 5(b) show the structures of a tongue and a buckle according to the present invention.
Figure 5B:
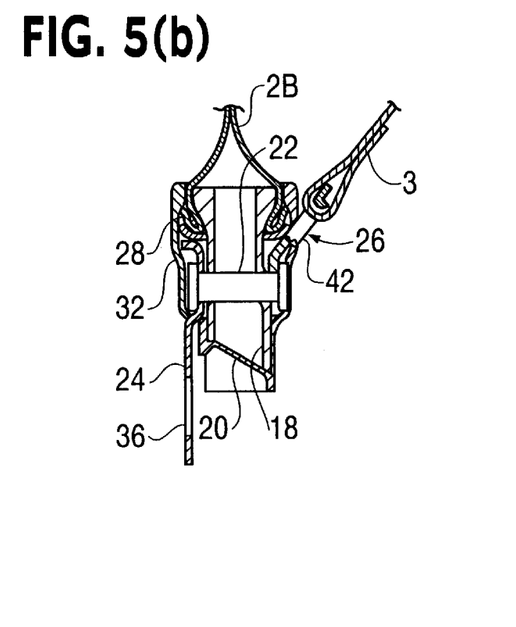
Figure 6:
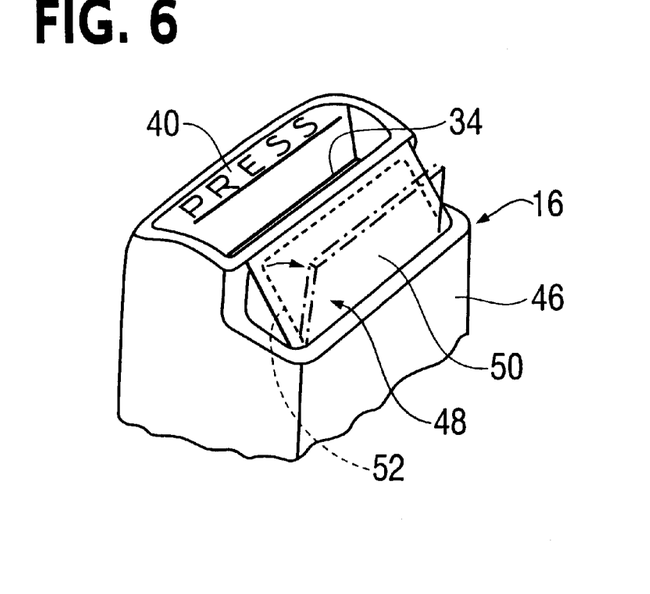
FIG. 6 shows the tip arrangement of an buckle according to the present invention.
Figure 7:
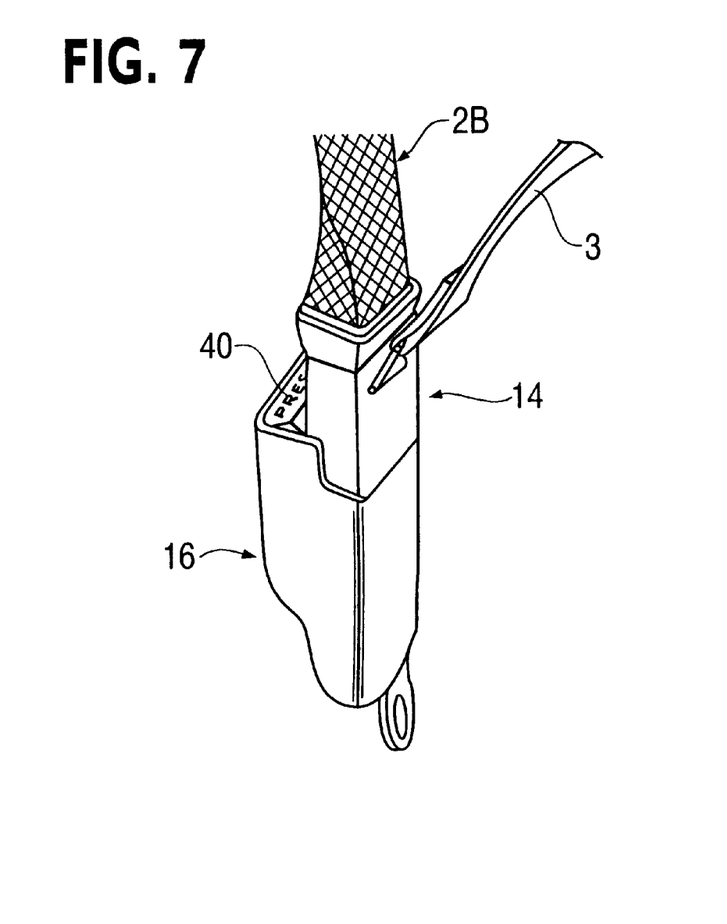
FIG. 7 is a perspective view of a buckle and a tongue according to the present invention, connected to each other.

FIGS. 5 through 8 show the first embodiment of a tongue and a buckle. FIG. 5(a) is a cross-sectional view to showing a tongue 14 and a buckle 16. FIG. 5(b) is a cross-sectional view taken along line B—B in FIG. 5(a). FIG. 6 is a perspective view of the upper part of the embodiment. FIG. 7 is a perspective view showing the whole of the tongue and buckle joined together. FIGS. 8(a) and 8(b) are enlarged cross-sectional views of the joint.

The tongue 14 has a tongue base 18, a seal 20, a tongue plate 24, an anchor 26, a ring 28, a plastic cover 32, and so on. The tongue base 18 has an internal cavity. The seal 20 closes the front end of the tongue base 18. The tongue plate 24 and anchor 26 are connected to the tongue base 18 by connecting pins 22. The ring 28 attaches the air belt 2B to the tongue base 18. The plastic cover 32 encloses the tongue base 18. The seal 20 is provided with a tear line 33.

When the tongue plate 24 is inserted into the buckle 16 through a port 34 (FIG. 6), a latching pin of a latch mechanism 38 inside the buckle 16 is locked in a latching hole 36. By pressing a button 40 on the buckle 16, one can unlock the latch and subsequently release the tongue plate 24 from the buckle 16 with a help of a spring.

The anchor 26 has a port 42 through which the tip of the lap belt 3 is inserted and is connected to the anchor 26.

The buckle 16 has a shell comprising a housing 46, on the top surface of which are provided the port 34 for the insertion of the tongue plate 24 and a gas port 48.

The gas port 48 is sealed with the seal 50 having a tear line 52.

Inside the housing 46 are provided a duct 56 and an inflator 58. A flap 54 is pivotally supported at an end of the duct 56 and can be opened.

Figure 8A:
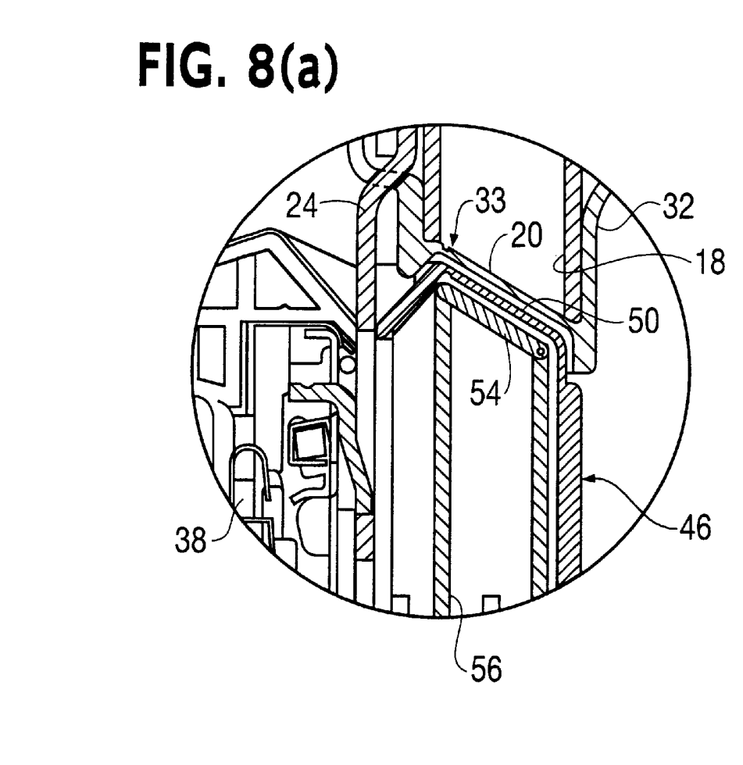
FIGS. 8(a) and 8(b) are cross-sectional views of a buckle and a tongue connected to each other.
Figure 8B:
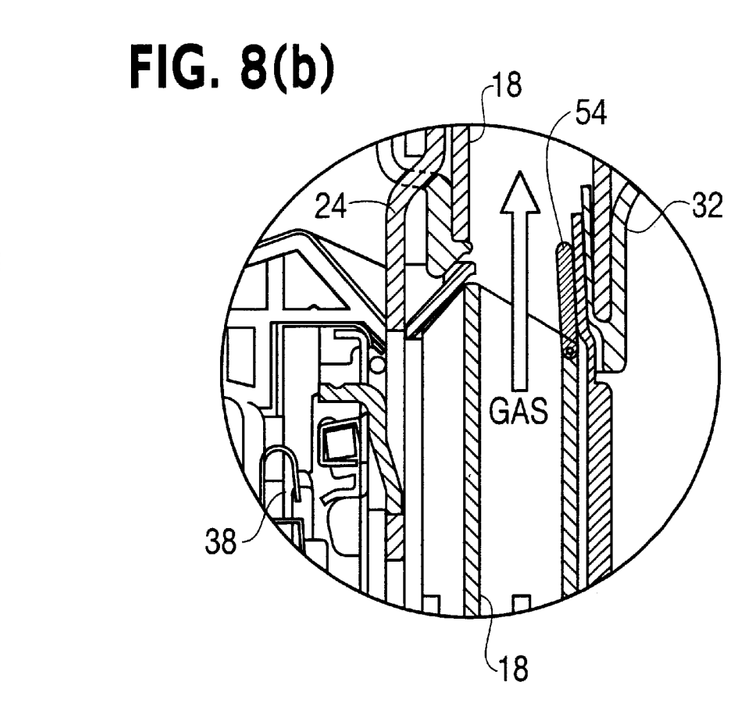

When the inflator 58 is activated, the flap 54 pushes the seal 50, causing the seal 20 to tear apart along the tear line 52. Subsequently, the seal 20 breaks apart along the tear line 33 and the gas is supplied to the air belt 2B, inflating the air belt 2B immediately.

Figure 9A:
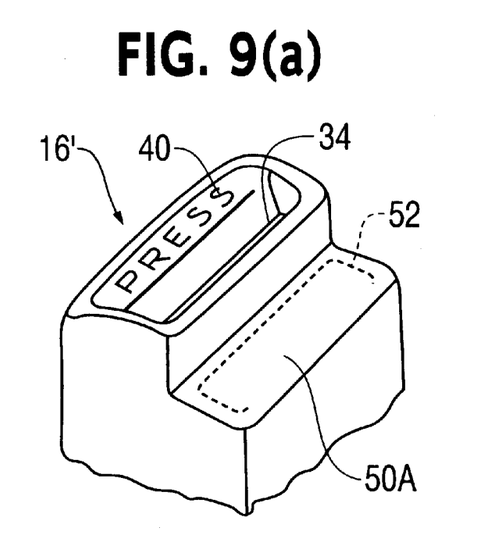
FIGS. 9(a) and 9(b) show another arrangement of a buckle and a tongue connected to each other.
Figure 9B:
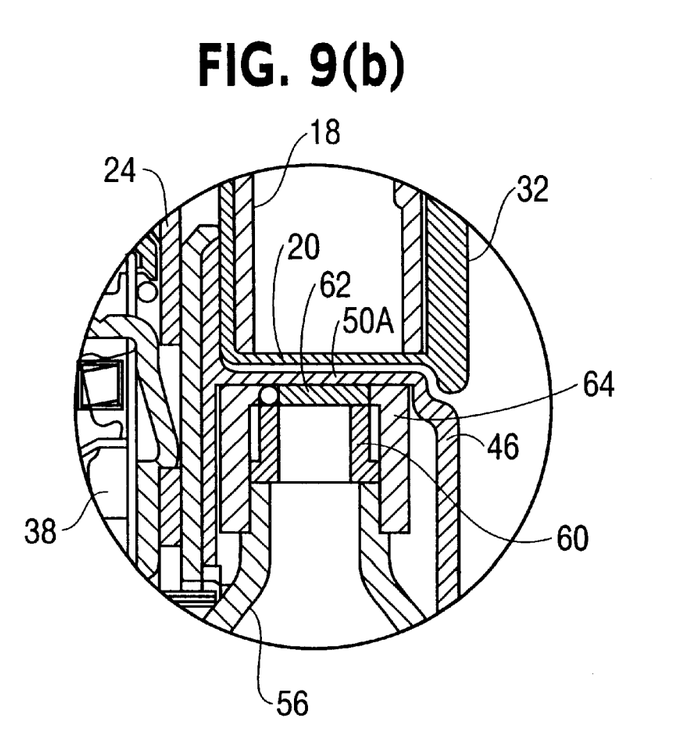
Figure 10A:
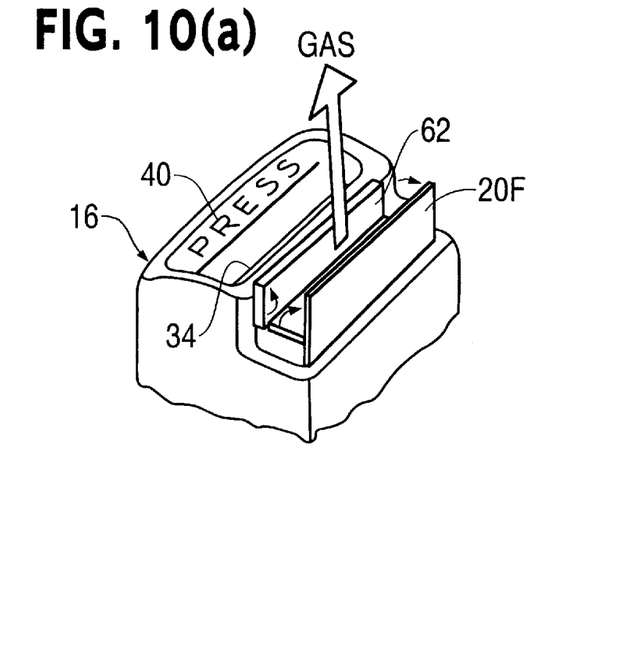
FIGS. 10(a) and 10(b) show the gas flow direction in the arrangement shown in FIG. 9.
Figure 10B:
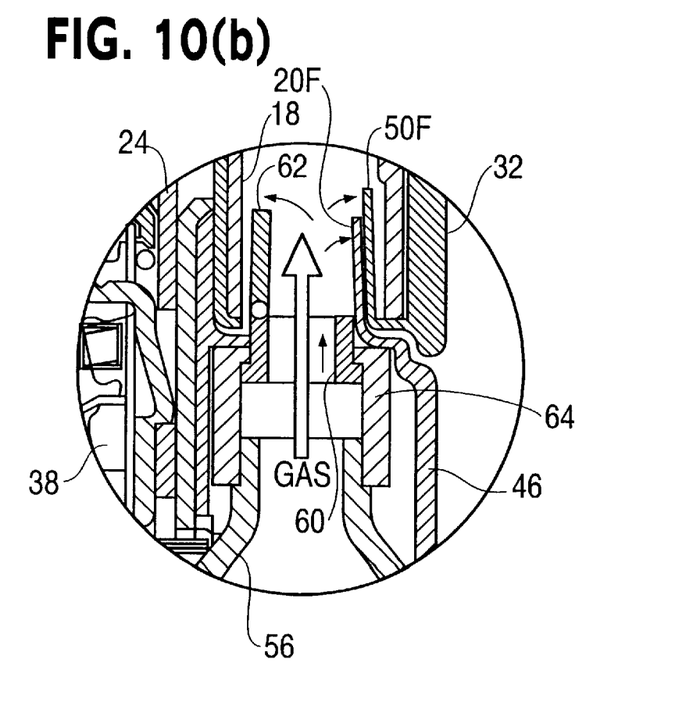

Though the embodiment features the seal 50 that is inclined to prevent dust from accumulating on it, it is also possible to have a seal 50A with a level upper surface as shown in FIGS. 9 and 10.

FIGS. 9 and 10 show a second embodiment of a tongue and a buckle. FIG. 9 shows those under normal operation, and FIG. 10 shows the condition where the inflator is activated. FIGS. 9(a) and 10(a) are perspective views showing upper parts of the buckle 16'. FIGS. 9(b) and 10(b) are cross-sectional views showing the joints between the tongue and buckle.

In FIGS. 9 and 10, it can be seen that a cylinder 60 with a flap is placed in the buckle under the seal 50A. The cylinder 60 is connected to a duct 56 via a stopper 64. The other reference numbers in FIGS. 9 and 10 correspond to analogous parts in FIGS. 6 and 8.

When the inflator 58 is activated, the cylinder 60 moves forward (upward). This breaks the seal 50A and subsequently, the seal 20. The flap 62 then opens up in the tongue base 18 to permit the gas flow into the air belt 2B. At this point, flaps 20F and 50F resulting from the breakage of the seals 20 and 50 cover the inner surface of the tongue base 18 at its entrance, preventing gas leakage.

Figure 11A:
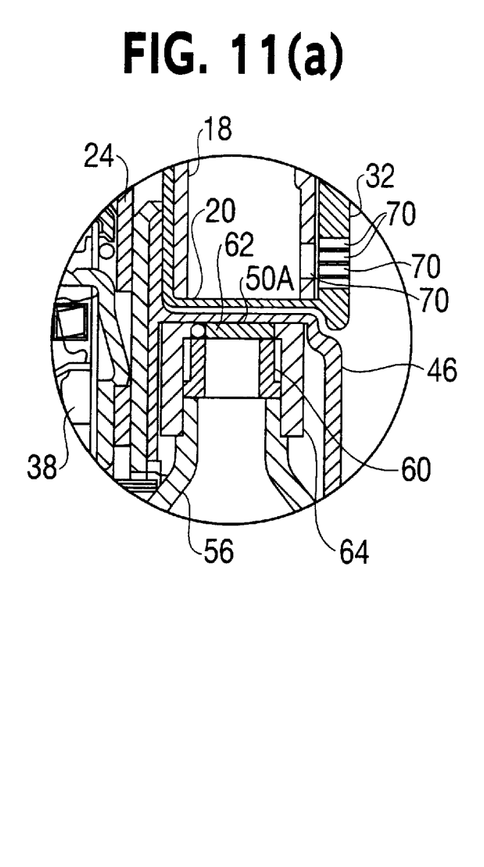
FIGS. 11(a)–11(c) show the structure of a connection of a tongue and a buckle used in another embodiment.
Figure 11B:
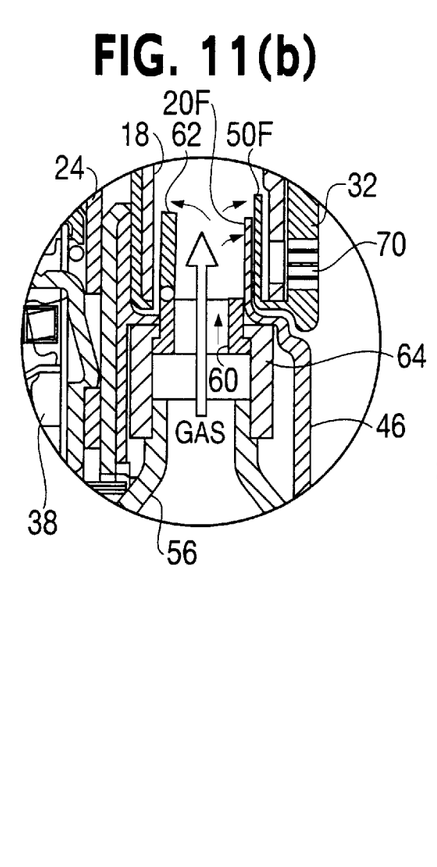
Figure 11C:
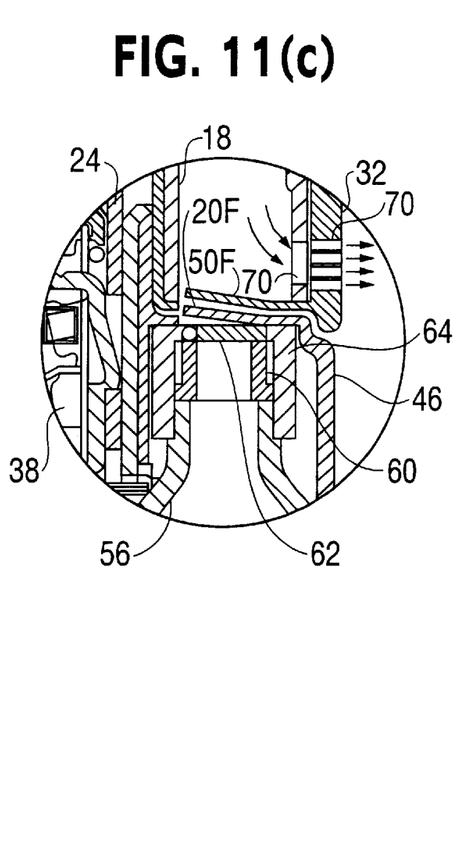

FIGS. 11(a), 11(b), and 11(c) are cross-sectional views of the third embodiment of a tongue and a buckle. In this embodiment, vents 70 are further provided to the embodiment described in FIGS. 9 and 10. The vents are formed at the tip of the tongue. Upon the activation of the inflator, flaps 20F and 50F cover up the vents 70 as shown in FIG. 11(b), allowing the gas to flow into the air belt 2B and inflate it. As the amount of the gas generated by the inflator decreases, the pressure inside the air belt 2B exceeds the pressure of the incoming flow, which causes the flaps 20F and 50F to move back to their original positions. Consequently, the vents 70 open up to let the gas in the air belt 2B out gradually. The gradual release of the gas from the belt minimizes the impact that applies on the passenger's body when the body is pressed against the belt upon a collision.

As described above, the air belt device according to the present invention provides an air belt that can comfortably be fastened on the passenger's body while it protects the passenger upon collisions by means of shortening. The impact applying on the passenger's body can be reduced significantly by providing vents to gradually release the gas after the completion of the belt inflation.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

This application is one of seven copending applications filed on even date

| U.S. Ser. No. | Our Docket No. | Japanese No. |
|---|---|---|
| Unknown | 086142/0203 | 09-236903 |
| Unknown | 086142/0204 | 09-236904 |
| Unknown | 086142/0205 | 09-236906 |
| Unknown | 086142/0206 | 09-236907 |
| Unknown | 086142/0207 | 09-236908 |
| Unknown | 086142/0208 | 09-236909 |
| Unknown | 086142/0209 | 09-236910 |

The instant application hereby incorporates by reference the entire specification including claims and abstract and the drawings of each of the other six applications.

What is claimed is:

1. An air belt device comprising:

an inflatable air belt, wherein said air belt has a bag-like belt folded in a strip-like state and a cover for covering the bag-like belt;

a gas generator to supply gas to the air belt to inflate the same;

a buckle with a cylinder inside for breaking a seal member in the buckle when the gas generator is activated; and a tongue with an opening for introducing gas from the gas generator through the buckle.

2. An air belt device as set forth in claim 1, wherein the cylinder has a flap which opens for allowing the gas to pass through after breaking the seal member.

3. An air belt device as set forth in claim 1, wherein the seal member has at least one tear line.

4. An air belt device as set forth in claim 3, wherein the seal member has a flap-like shape after tearing the tear line.

5. An air belt device as set forth in claim 1, wherein the tongue has at least one vent hole to release gas from the air belt.

6. An air belt device as set forth in claim 5, wherein the vent hole is covered by a flap formed from the seal member when gas is introduced into the air belt and the vent hole is uncovered when the inflation of the air belt is completed.

7. An air belt device comprising:

an inflatable air belt, wherein said air belt has a bag-like belt folded in a strip-like state and a cover for covering the bag-like belt;

a gas generator to supply gas to the air belt to inflate the same;

a buckle with a cylinder inside for breaking a seal member when the gas generator is activated; and a tongue with an opening for introducing gas from the gas generator through the buckle, wherein the seal member is in the tongue and closes the opening.

8. An air belt device as set forth in claim 7, wherein the cylinder has a flap which opens for allowing the gas to pass through after breaking the seal member.

9. An air belt device as set forth in claim 7, wherein the seal member has at least one tear line.

10. An air belt device as set forth in claim 9, wherein the seal member has a flap-like shape after tearing the tear line.

11. An air belt device as set forth in claim 7, wherein the tongue has at least one vent hole to release gas from the air belt.

12. An air belt device as set forth in claim 11, wherein the vent hole is covered by a flap formed from the seal member when gas is introduced into the air belt and the vent hole is uncovered when the inflation of the air belt is completed.

13. An air belt device comprising:

an inflatable air belt, wherein said air belt has a bag-like belt folded in a strip-like state and a cover for covering the bag-like belt;

a gas generator to supply gas to the air belt to inflate the same;

a buckle with a cylinder inside for breaking first and second seal members when the gas generator is activated; and a tongue with an opening for introducing gas from the gas generator through the buckle, wherein first seal member is in the tongue and closes the opening, and wherein the second seal member is in the buckle.

14. An air belt device as set forth in claim 13, wherein the cylinder has a flap which opens for allowing the gas to pass through after breaking the first and second seal members.

15. An air belt device as set forth in claim 13, wherein the first and second seal members have at least one tear line.

16. An air belt device as set forth in claim 15, wherein the first and second seal members have a flap-like shape after tearing the tear line.

17. An air belt device as set forth in claim 13, wherein the tongue has at least one vent hole to release gas from the air belt.

18. An air belt device as set forth in claim 17, wherein the vent hole is covered by at least one flap formed from the first and second seal members when gas is introduced into the air belt and the vent hole is uncovered when the inflation of the air belt is completed.

* * * * *